United States Patent [19]
O'Rourke et al.

[11] Patent Number: 5,623,892
[45] Date of Patent: Apr. 29, 1997

[54] HINGE ASSEMBLY FOR PROVIDING A CAT LITTER BOX WITH A READILY REMOVABLE HINGED COVER

[75] Inventors: Anthony O'Rourke, Malibu; Charles Byrne, Mammoth Lakes, both of Calif.

[73] Assignee: Aspen Pet Inc., Denver, Colo.

[21] Appl. No.: 264,791

[22] Filed: Jun. 23, 1994

[51] Int. Cl.$^6$ .................................................. A01K 29/00
[52] U.S. Cl. ............................................................ 119/165
[58] Field of Search ..................................... 119/165, 168, 119/15, 19; 320/334, 335, 339

[56] References Cited

U.S. PATENT DOCUMENTS

| | | | |
|---|---|---|---|
| 1,686,969 | 10/1928 | Hebden | 220/334 |
| 1,954,874 | 4/1934 | Hopkins | 220/334 X |
| 3,966,084 | 6/1976 | Box | 220/334 X |
| 4,041,571 | 8/1977 | Blevins | 220/335 X |

*Primary Examiner*—Nicholas D. Lucchesi
*Assistant Examiner*—Thomas Price
*Attorney, Agent, or Firm*—Crowell & Moring LLP

[57] ABSTRACT

A hinge of single piece construction particularly adapted for providing a removable pivotal attachment for a raised cover on a cat litter box wherein the rearward ends of the litter container and cover are each provided with vertical slots positioned such that upon the cover being disposed on the container in a closed position the slots on the cover are disposed adjacently above and in axial alignment with the slots on the litter container. The hinge defines a curvilinear depending tab portion adapted to extend through one of the aligned pairs of slots against a portion of the litter box and be removably retained in a snug fitment within the slot in the litter container. The tab portion of the hinge member merges into a curvilinear guide portion extending upwardly and rearwardly from the tab portion which merges into a cover support portion. Upon the tab portions of a pair of hinges being extended through the aligned vertical slots and the forward end of the cover being raised from the container, the cover is caused to pivot rearwardly on the container by the curvilinear guide portions of the hinges until a raised rear wall portion of the cover abuts the cover support portions of the hinges causing the tab position of the hinges to bear against the litter box whereupon the cover rests on the support portions of the hinges in a fully open position without the need for additional support while providing unobstructed access to the litter container.

15 Claims, 2 Drawing Sheets

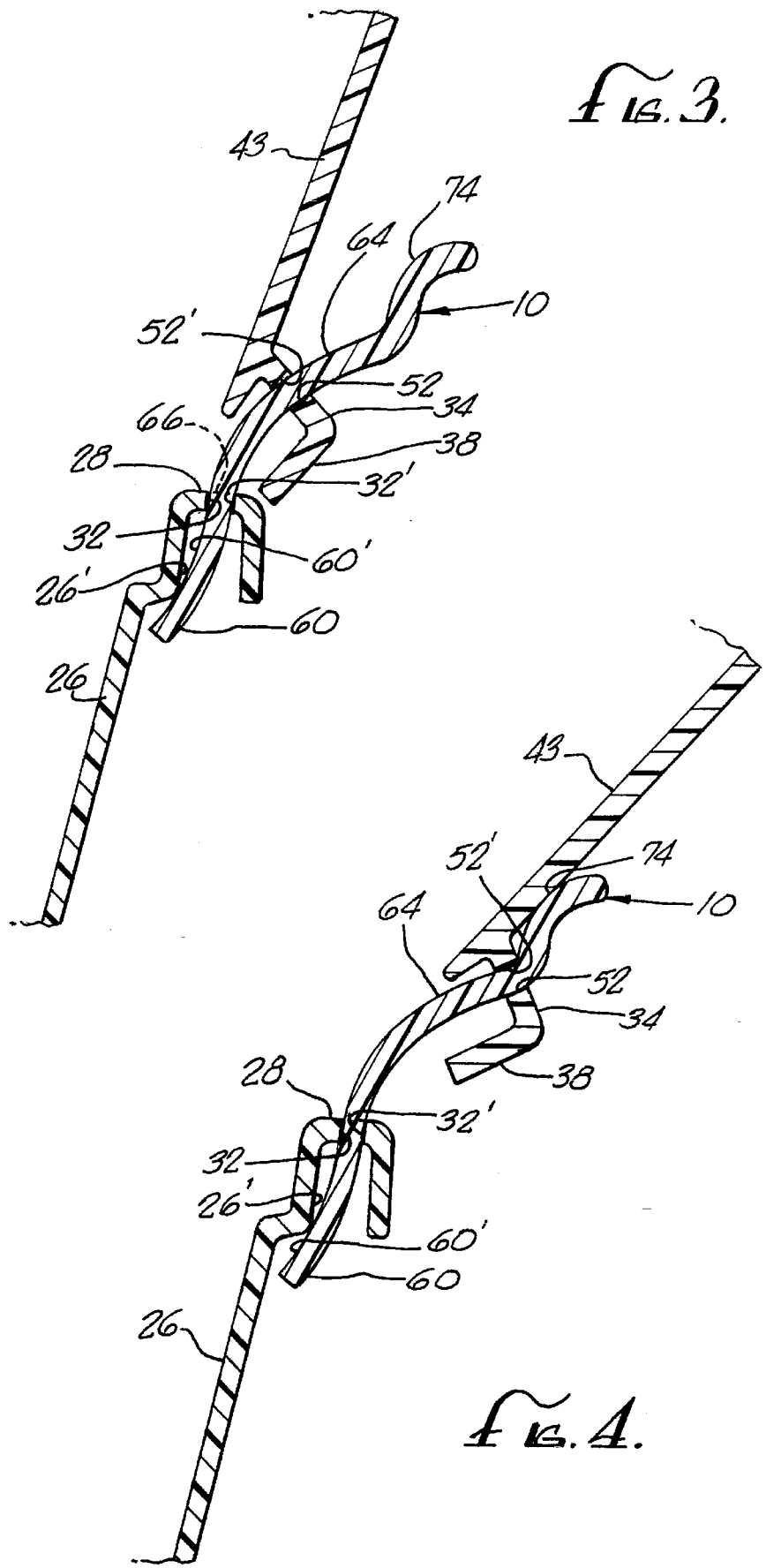

HINGE ASSEMBLY FOR PROVIDING A CAT LITTER BOX WITH A READILY REMOVABLE HINGED COVER

BACKGROUND OF THE INVENTION

The present invention relates to a novel hinge configuration particularly adapted for providing a cat litter box with a removable hinge cover. The use of removable covers for cat litter boxes has become increasingly popular as the cover conceals the animal waste and soiled litter from view. Such covers generally comprise elevated side walls so that the cat can use the litter box without the pet owner having to remove the cover from the litter box. It has been found that the privacy afforded by such litter box covers is preferred by many cats. An example of a cat litter box having a removable elevated cover is the litter box marketed by Booda Products, Inc. under the trademark BOODABOX.

When the waste and soiled litter are removed from a covered litter box or when the litter is changed, the pet owner must remove and replace the cover. For a litter box cover to be acceptable to cats, it must be relatively large so as not to appear overly confining and provide easy access for the cat and adequate space for the cat to stand within the box. As a result, many pet owners have found litter box covers inconvenient to use and awkward to handle. By providing a hinged securement of the cover to the rear of the box, these problems could be obviated as the pet owner could merely pivot the cover out of the way to provide unobstructed access to the interior of the litter box. However, conventional hinge mechanisms are not readily detachable and would render the litter box more difficult to clean and, due to the bulk of the box with the cover attached, more difficult to transport. It would be highly desirable to provide a hinge mechanism for use on a cat litter box which allowed for such pivotal movement of the cover on the box and which allowed the cover to be readily detached from the box. Due to space limitations in many locations where cat litter boxes are kept, it would also be desirable if such a hinge mechanism provided a support for the cover in the raised position to maintain unobstructed access to the box without having to pivot the cover rearwardly of the box to the floor. The hinge mechanism of the present invention achieves these objectives and does so with a minimal impact on the cost of the litter box.

SUMMARY OF THE INVENTION

The present invention relates to a hinge mechanism particularly adapted for providing a readily detachable hinged mounting of an elevated cover on a cat litter box. The hinge of the present invention allows the cover to be pivoted rearwardly with respect to the litter box and supports the cover in a raised open position to provide unobstructed access to the litter box to facilitate removal of cat waste and soiled litter and changing of the litter. The hinge also allows for the cover to be easily detached from the litter box for cleaning and transporting. The hinge mechanism of the present invention is of single piece construction and is generally employed in spaced pairs between the litter box and cover to provide the aforesaid detachable hinged mounting.

Each hinge comprises a flat, inwardly curved, vertically depending portion terminating at its upper end in a first curvilinear guide portion extending upwardly and rearwardly therefrom and defines a pair of laterally projecting shoulders therebetween. The guide portion of the hinge merges into an upstanding portion which terminates in a rearwardly projecting cover support portion.

The cat litter box and cover are each preferably provided with an outwardly projecting perimeter edge portion sized that such upon a cover being disposed in place on the litter box, the edge portion of the cover projects over and about and rests on the edge portion of the box. Two pairs of aligned vertical slots are provided in the rear edge portions of the litter box and cover with the slots in the cover being slightly larger than the length of the slots in the litter box such that upon the projecting depending portions of the hinges through the vertically aligned slots, the hinge shoulders abut the rear upper edge of the litter box adjacent the slots therein while the depending portions of the hinges are held in a snug fitment within the litter box slots, thereby removably mounting the hinges on the litter box and the rear of the cover about the guide portions of the hinges. So secured, the inner surfaces of the curvilinear depending portions of the hinges abut the rear wall of the litter box below and inwardly of the slotted edge portions thereof. As the forward end of the cover is raised from the litter box, the slotted portions of the cover ride upwardly and rearwardly over the curvilinear guide portions of the hinges until the raised rear wall of the cover abuts the cover support portions of the hinges, causing the inwardly curved depending portions of the hinges to bear against the rear wall of the litter box, preventing any further pivoting of the cover with respect to the box. In this fully open position the weight of the raised portion of the cover causes the cover to rest against the cover support portions of the hinges without the need of additional support, thereby obviating the need for the pet owner to hold the cover in an open position while allowing unrestricted access to the litter box. The cover can be removed from the litter box for cleaning and transportation purposes by merely pulling the hinges upwardly through the aligned slots in the litter box and cover.

It is the principal object of the present invention to provide a hinge mechanism for pivotally mounting a cover on a cat litter box to facilitate unrestricted access to the litter box and allow the cover to be readily removed from the box for cleaning and/or transportation purposes.

It is another object of the present invention to provide a readily removable hinge mechanism for pivotally mounting a cover on a cat litter box such that the cover is free standing in the raised open position to provide unrestricted access to the box without having to hold the cover in the open position.

It is further object of the present invention to provide a readily removable hinge mechanism for pivotally mounting a cover on a cat litter box which is of economical construction and easily manufactured.

These and other objects and advantages of the present invention will become readily apparent from the following detailed description taken in conjunction with the accompanying drawings.

FIG. 3 is a partial sectional side view illustrating the cover in a partially opened position.

FIG. 4 is a partial sectional side view illustrating the cover in the fully opened position.

Figure 1:
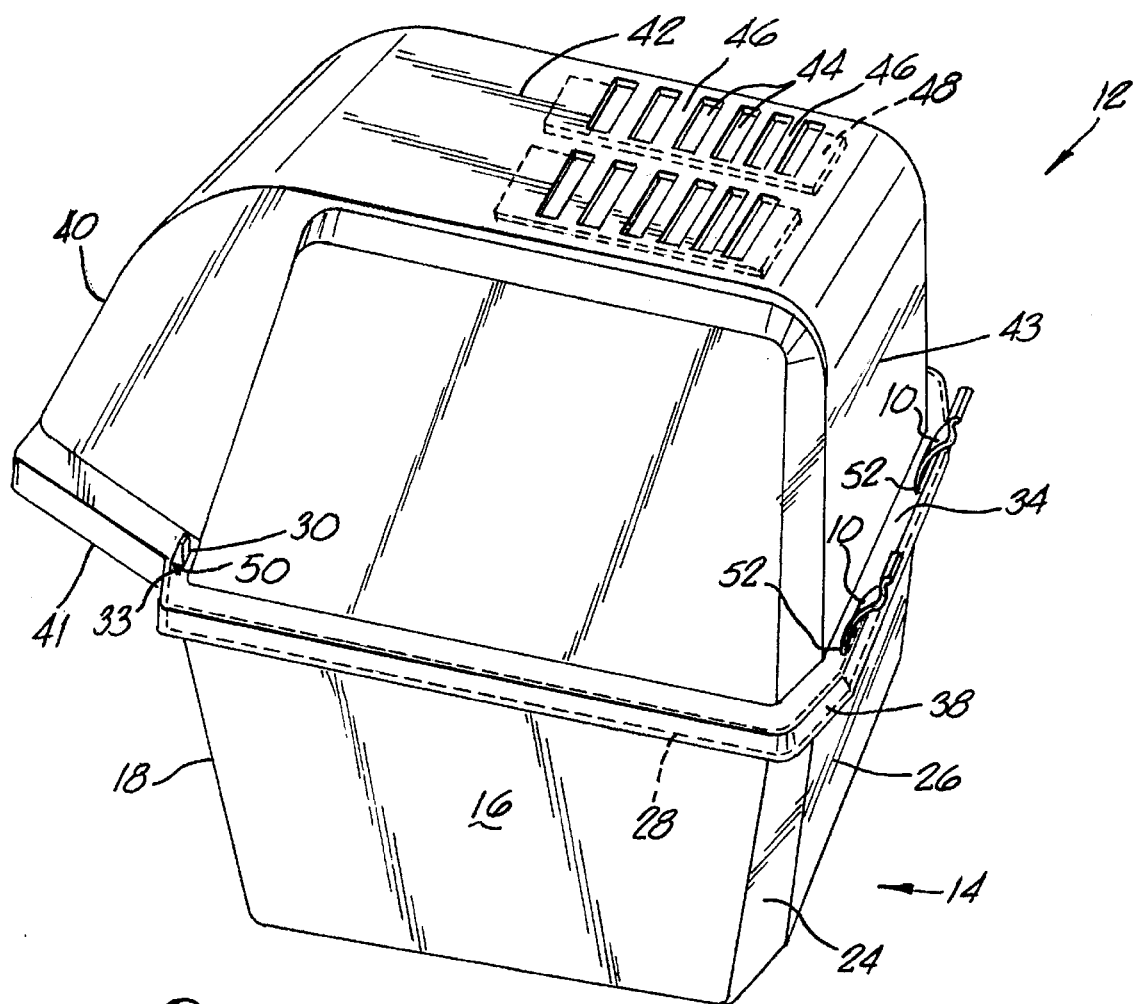
FIG. 1 is a perspective view of a covered cat litter box employing the hinge mechanism of the present invention.
Figure 2:
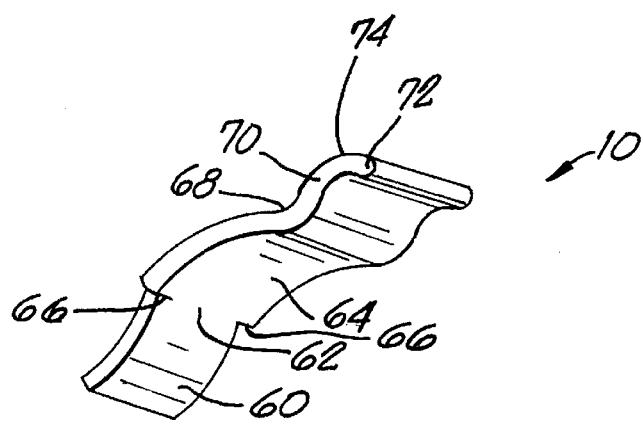
FIG. 2 is a perspective view of the hinge of the present invention.

Referring now in detail to the drawings, the hinge member 10 of the present invention is particularly designed for providing a removable pivotal mounting of a litter box cover 12 on a cat litter box 14. The cat litter box 14 shown in the drawings is provided with a slightly inclined side walls 16, a forwardly inclined front wall 18, a pair of upwardly inclined and converging forward wall portions (not shown) joining side walls 16 with front wall 18, and a pair of inclined angularly disposed rear wall portions 24 (only one being shown) joining side walls 16 with inclined rear wall 26. An inverted U-shaped upper perimeter edge portion 28 is defined by the upper ends of forward wall portions 22, side walls 16, rear wall portions 24 and rear wall 26. A pair of resilient, locking tabs 30 (one being shown) project upwardly from the upper edge portions of forward inclined wall portions of the litter box 14 and a pair of spaced apart elongated rectangular vertical slots 32 are disposed in the upper edge portion 28 proximate the lateral ends of rear wall 26.

The mating litter box cover 12 is preferably designed to correspond generally in configuration to the litter box 14 and defines a lower perimeter lip portion 34 comprised of an outwardly inclined surface 36 and a depending skirt 38 which are adapted to extend over and about and rest on the upper perimeter edge portion 28 of the litter box 14 upon the cover 12 being disposed thereon. In the embodiment of cover 12 illustrated in the drawings, the cover defines a forwardly projecting canopy 40 which extends beyond the forward wall 18 of the litter box so as to provide an entrance 41 for a cat into the litter box 14 with the cover 12 disposed thereon. Alternatively, the cat entrance could be provided in the forward wall of the litter box, in the forward wall of the cover, or partially in the box and partially in the cover. The top surface 42 of cover 12 defines a pair of openings 44 therein spanned by a plurality of transverse louvers 46 adapted to receive air filtration elements 48 therein to reduce any odors emanating from the litter box.

The perimeter lip portion 34 of cover 12 defines a pair of vertical slots 50 therein adjacent the forward end of canopy 40 which are adapted to receive the locking tabs 30 on the litter box 14. Locking tabs 30 define undercut portions 33 therein such that when the cover is disposed in place upon the litter box, the locking tabs 30 are deflected rearwardly as they pass through slots 50 in cover 12 and snap forwardly when the undercut portions 33 project beyond the upper ends of slots 50 thereby removably securing the forward end of cover 12 to the litter box 14. The inclined surface 36 of the perimeter lip portion 34 of cover 12 defines a pair of rearwardly disposed elongated rectangular vertical slots 52 therein. Slots 52 are positioned in lip portion of 34 so as to be disposed directly above rectangular slots 32 in the upper edge portion 28 of litter box 14. The slots 52 in the rear of cover 12 are longer and slightly wider than the slots 32 in the litter box 14 so to provide the desired mounting of hinges 10 therein as will be explained.

Hinges 10 are of single piece construction, preferably constructed nylon and formed by injecting molding, although metal or other durable plastic materials could be used. Each hinge comprises a flat, inwardly curved, vertically depending tab portion 60, rectangular in cross-section and sized so as to be insertable through one of the pairs of aligned slots 52 and 32 in the litter box cover 12 and litter box 14 and snugly retained in one of the slots 32 in the rear upper edge portion of litter box 14. Tab portion 60 is inwardly curved so that upon being inserted through slots 52 and 32, the inwardly projecting surface 60' thereof is disposed adjacent portions 26' of the rear wall 26 of litter box 14. Tab portion 60 merges at 62 into a upwardly and rearwardly projecting curvilinear guide portion or hinge portion 64, also rectangular in cross-section. Curvilinear guide portion 64 has a transverse dimension and thickness slightly less than the length and width of slots 52 in cover 12 such that the cover is moveable thereover. The transverse dimension of hinge portion 64 is also slightly greater than the transverse dimension of the tab portion 60 of the hinge so as to define a pair of laterally projecting shoulders 66 adjacent hinge portions 60 and 64. Curvilinear guide portion 64 merges at its upper end 68 into an upstanding portion 70 which terminates at its upper end in a second outwardly and rearwardly extending curvilinear portion 72, defining a cover support surface 74.

To install hinges 10, the depending tab portions 60 are inserted through the pairs of aligned slots 52 and 32 in the rear of cover 12 and litter box 14 until the hinge shoulders 66 abut the upper edge portion 28 of the litter box. The snug fitment of the tab portions of the hinge within slots 32 provide a removable mounting of the hinges on the litter box. As the forward end of the cover 12 is raised from the litter box 14 after releasing the locking tabs 30 at the forward end thereof, the interior wall surfaces 52' of slots 52 ride upwardly and rearwardly along the curvilinear guide portions 64 of hinges 10, causing a pivoted movement of the cover about the rear end of the litter box. This movement continues until the portions of rear wall 43 of cover 12 abuts the cover support surfaces 74 of the hinges. As the litter box cover abuts hinge surfaces 74, the surfaces 60' of the tab portions 60 of the hinges are caused to bear against the adjacent portions 26' of the litter box 14, as seen in FIG. 4, preventing the hinges from pivoting relative to the litter box and thereby limiting the rearward pivotal movement of the cover on the litter box. The litter box cover 12 is then in a fully open position, providing unobstructed access to the litter box 14. As the rear wall 43 of cover 12 is inclined inwardly, a substantial portion of the litter box cover 12 is disposed rearwardly of the hinges 10 in the fully open position. The weight of the cover 12 thus maintains the cover in its fully open position providing an unobstructed access to the litter box without the need for additional support.

Various changes in modifications may be made in carrying out the present invention. Insofar as these changes and modifications are within the purview of the appended claims, they are to be considered as part of the present invention. In this regard, it is to be understood that the particular configurations of the litter box cover 12 and box 14 are disclosed herein merely as examples of cover and litter box configurations which can be employed with the hinges 10 of the present invention. Other litter box cover and box configurations could be employed. Indeed, while the hinge 10 of the present invention is particularly adapted for providing a removable pivotal mounting of an elevated cover on a cat litter box, the hinge configuration could also be employed to provide such a mounting for a wide variety of covered box applications.

I claim:

1. A cat litter box assembly comprising:
   a container adapted to hold a supply of cat litter therein and having upstanding side and rear wall portions, an open upper end and defining an upper edge;
   a cover adapted to be carried by and disposed over said open upper end of said container, said cover having a forward end, a rearward end and raised wall portions and defining a lower edge adapted to be disposed over and adjacent said upper edge on said container upon said cover being disposed on said container;
   a pair of first laterally spaced vertical slots disposed adjacent said upper edge of said container adjacent said rear wall portion thereof;
   a pair of second laterally spaced vertical slots disposed adjacent said lower edge of said cover, said second slots being disposed over and axially aligned with said first slots in said container upon said cover being disposed on said container;

a pair of hinge members providing a removable pivotal attachment of said cover on said container whereby said cover can be moved on said container between a closed and a fully open position, each of said hinge members defining a depending tab portion, a curvilinear guide portion extending upwardly and rearwardly from said tab portion and merging into a cover support portion of said hinge member, said tab portion being extendable through one of said first and second aligned slots and being configured so as to be removably retained within one of said first slots, said guide portion being configured relative to said second slots so as to allow sliding movement of said cover upwardly and rearwardly along said guide portion, whereby upon said cover being disposed on said container, said tab portions inserted through said aligned slots, respectively, and said forward end of said cover raised from said container, said cover is caused to pivot rearwardly with respect to said container by said curvilinear guide portions of said hinge members until raised wall portions at the rearward end of said cover abut said cover support portions of said hinge members whereupon said cover is in said fully open position providing unobstructed access to said container.

2. The litter box assembly of claim 1 wherein each of said depending tab portions of said hinge members is curvilinear and upon being extended through one of said first and second aligned slots is disposed adjacent an exterior portion of said container and abuts said exterior portion upon said cover being moved to said fully open position, thereby limiting the rearward pivotal movement of said cover with respect to said container.

3. The litter box assembly of claim 2 wherein said hinge members are of a single piece construction and each member defines a shoulder disposed adjacent said tab and guide portions, said shoulder being adapted to abut said container adjacent one of said first slots therein upon said tab portion being inserted through one of said first slots.

4. The litter box assembly of claim 2 wherein said upper edge of said container extends substantially about the perimeter of said open upper end, and defines an upper lip substantially of an inverted "U"-shape in cross-section, and wherein said lower edge of said cover extends substantially about the perimeter of said cover and defines a lower lip comprising an outwardly projecting portion adapted to abut and rest on said upper lip of said container and a depending skirt portion extending about said upper lip, said second slots being disposed in said outwardly projecting portion of said lower lip.

5. The litter box assembly of claim 1 wherein said raised wall portions at the rearward end of said cover are disposed forwardly of said first and second slots upon said cover being disposed on said container in said closed position such that a substantial portion of said cover is disposed rearwardly of said cover support portions of said hinge members upon said cover being moved to said fully open position, whereby said cover rests against said support portions in said fully open position without the need for additional support.

6. The litter box assembly of claim 1 wherein said hinge members are of a single piece construction and each member defines a shoulder disposed adjacent said tab and guide portions, said shoulder being adapted to abut said container adjacent one of said first slots therein upon said tab portion being inserted through one of said first slots.

7. The litter box assembly of claim 6 wherein said first and second slots and said tab and guide portions of said hinge members are substantially rectangular in cross-section, the length and width of said second slots being greater than the length and width respectively of said first slots and the transverse dimension of said guide portions of said hinge members being greater than the transverse dimension of said tab portions and less than the length of said second slots.

8. A cat litter box assembly comprising:

a container adapted to hold a supply of cat litter therein and having upstanding side and rear wall portions and an open upper end, and defining an upper lip extending about said side and rear wall portions;

a cover adapted to be carried by and disposed over said open upper end of said container, said cover having a forward end, a rearward end and raised wall portions, and defining a lower lip adapted to be disposed over and adjacent said upper lip on said container upon said cover being disposed on said container;

a pair of first laterally spaced vertical slots disposed in said upper lip of said container adjacent said rear wall portion thereof;

a pair of second laterally spaced vertical slots disposed in said lower lip of said cover, said slots being disposed over and axially aligned with said slots in said upper lip of said container upon said cover being disposed on said container;

a pair of hinge members providing a removable pivotal attachment of said cover on said container whereby said cover can be moved on said container between a closed and a fully open position and be readily detached therefrom, each of said hinge members defining a curvilinear depending tab portion, a curvilinear guide portion extending upwardly and rearwardly from said tab portion and merging into a cover support portion of said hinge member, said tab portion being extendable through one of said first and second aligned slots and being configured so as to be removably retained within one of said first slots, and said guide portion being configured relative to said second slots so as to allow sliding movement of said cover upwardly and rearwardly along said guide portion, whereby upon said cover being disposed on said container, said tab portions inserted through said aligned slots, respectively, and said forward end of said cover raised from said container, said cover is caused to pivot rearwardly with respect to said container by said curvilinear guide portions of said hinge members until raised portions at the rearward end of said cover abut said cover support portions of said hinge members and said tab portions of said hinge members abut said container, whereupon the positioning of said cover relative to said hinge members causes said cover to rest against said cover support portions providing unobstructed access to said container without the need for additional support.

9. The litter box assembly of claim 8 wherein said raised wall portions at the rearward end of said cover are disposed forwardly of said first and second slots upon said cover being disposed on said container in said closed position such that a substantial portion of said cover is disposed rearwardly of said cover support portions of said hinge members upon said cover being moved to said fully open position.

10. The litter box assembly of claim 8 wherein said first and second slots and said tab and guide portions of said hinge members are substantially rectangular in cross-section, the length and width of said second slots being greater than the length and width respectively of said first slots and the transverse dimension of said guide portions of said hinge members being greater than the transverse dimension of said tab portions and less than the length of said second slots.

11. The litter box assembly of claim 10 wherein said upper lip extends substantially about the perimeter of said open upper end, is substantially of an inverted "U"-shape in cross-section and defines a support surface for said cover, and wherein said lower lip extends substantially about the perimeter of said cover and defines an outwardly projecting portion adapted to abut and rest on said upper lip of said container and a depending skirt portion adapted to extend about said upper lip.

12. A hinged box assembly comprising:

a container having a forward end, a rearward end, a plurality of upstanding wall portions, and a pair of vertically disposed and laterally spaced slots disposed at said rearward end thereof;

a cover adapted to be carried by and disposed over said container and having a forward end, a rearward end, and a pair of vertically disposed and laterally spaced slots disposed at said rearward end thereof, said slots being positioned on said cover so as to be axially aligned with said slots in said container upon said cover being disposed on said container; and a pair of hinge members providing a removable pivotal attachment of said cover on said container whereby said cover can be moved on said container between a closed and a fully open position, each of said hinge members defining a depending tab portion, a curvilinear guide portion extending upwardly and rearwardly from said tab portion and merging into a cover support portion of said hinge member, said tab portion being extendable through one of said slots in said container and one of said slots in said cover and being configured so as to be removably retained within one of said slots in said container, said guide portion being configured relative to said second slots so as to allow sliding movement of said cover upwardly and rearwardly along said guide portion, whereby upon said cover being disposed on said container, said tab portions inserted through said aligned slots respectively in said container and said cover and said forward end of said cover raised from said container, said cover is caused to pivot rearwardly with respect to said container by said curvilinear guide portions of said hinge members until portions of said cover abuts said cover support portions of said hinge members whereupon said cover is in said fully open position providing unobstructed access to said container.

13. The box assembly of claim 12 wherein each of said depending tab portions of said hinge members is curvilinear and upon being extended through one of said first and second aligned slots is disposed adjacent an exterior portion of said container and abuts said exterior portion upon said cover being moved to said fully open position, thereby limiting the rearward pivotal movement of said cover with respect to said container.

14. The box assembly of claim 13 wherein upon said cover being disposed in said fully open position, a substantial portion of said cover is disposed rearwardly of said cover support portions of said hinge members, causing said cover to rest against said cover support portions and tab portions of said hinge members to abut said container thereby maintaining said cover in said fully open position without the need for additional support.

15. The box assembly of claim 12 wherein said hinge members are of single piece construction and each hinge member defines a pair of lateral shoulders disposed adjacent said tab and guide portions thereof, said shoulders being adapted to abut said container adjacent one of said slots therein upon said tab portion being inserted through one of said slots therein.

* * * * *